United States Patent
Maiolani et al.

(10) Patent No.: US 9,417,884 B2
(45) Date of Patent: Aug. 16, 2016

(54) METHOD FOR ENABLING CALIBRATION DURING START-UP OF A MICRO CONTROLLER UNIT AND INTEGRATED CIRCUIT THEREFOR

(75) Inventors: Mark Maiolani, East Kilbride (GB); Alistair Robertson, Glasgow (GB)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 370 days.

(21) Appl. No.: 13/988,425

(22) PCT Filed: Nov. 22, 2010

(86) PCT No.: PCT/IB2010/055331
§ 371 (c)(1),
(2), (4) Date: May 20, 2013

(87) PCT Pub. No.: WO2012/069873
PCT Pub. Date: May 31, 2012

(65) Prior Publication Data
US 2013/0232330 A1 Sep. 5, 2013

(51) Int. Cl.
*G06F 9/44* (2006.01)
*F02D 41/06* (2006.01)
*F02D 41/24* (2006.01)
*F02D 41/26* (2006.01)

(52) U.S. Cl.
CPC ............ *G06F 9/4401* (2013.01); *F02D 41/064* (2013.01); *F02D 41/2432* (2013.01); *F02D 41/2487* (2013.01); *F02D 41/266* (2013.01); *G06F 9/4403* (2013.01)

(58) Field of Classification Search
CPC ... G06F 9/4401; G06F 9/4403; F02D 41/064; F02D 41/2432; F02D 41/266
See application file for complete search history.

(56) References Cited

U.S. PATENT DOCUMENTS

| | | | |
|---|---|---|---|
| 5,781,700 A | 7/1998 | Puskorius et al. | |
| 6,081,755 A | 6/2000 | Fujimoto | |
| 6,108,598 A | 8/2000 | Sumitani | |
| 6,505,105 B2 | 1/2003 | Allen et al. | |
| 6,978,666 B1 | 12/2005 | Wu et al. | |
| 8,073,611 B2 | 12/2011 | Loeffler et al. | |
| 8,135,533 B2 | 3/2012 | Noda | |
| 2001/0032289 A1 | 10/2001 | Terada et al. | |
| 2002/0091462 A1* | 7/2002 | Allen et al. | 700/176 |

(Continued)

FOREIGN PATENT DOCUMENTS

| | | |
|---|---|---|
| CN | 1404548 A | 3/2003 |
| DE | 102008042311 A1 | 4/2010 |

(Continued)

OTHER PUBLICATIONS

International Search Report and Written Opinion correlating to PCT/IB2010/055331 dated Aug. 23, 2011.

*Primary Examiner* — Dennis M Butler

(57) ABSTRACT

A method for enabling calibration during start-up of a micro controller unit device is provided. The method comprises, within the MCU device, reading overlay initialization data from at least one memory element within an external support device operably coupled to the MCU device, and configuring memory mapping functionality of the MCU device to overlay data stored within at least a part of device memory of the MCU device with calibration data stored within the at least one memory element of the external support device in accordance with the overlay initialization data.

20 Claims, 3 Drawing Sheets

(56) References Cited

U.S. PATENT DOCUMENTS

| | | | |
|---|---|---|---|
| 2003/0217222 A1* | 11/2003 | Deutscher et al. | 711/103 |
| 2004/0163014 A1 | 8/2004 | Correa | |
| 2004/0249558 A1 | 12/2004 | Meaney | |
| 2008/0172164 A1 | 7/2008 | Noda | |
| 2009/0187325 A1 | 7/2009 | Loeffler et al. | |
| 2009/0299600 A1 | 12/2009 | Guo et al. | |
| 2009/0307454 A1* | 12/2009 | Moessner et al. | 711/170 |

FOREIGN PATENT DOCUMENTS

| | | |
|---|---|---|
| JP | H07167163 A | 7/1995 |
| JP | 08177608 | 7/1996 |
| JP | 2000194546 | 7/2000 |
| JP | 2004220519 A | 8/2004 |
| JP | 2005084830 A | 3/2005 |
| JP | 2005194954 | 7/2005 |
| JP | 2008169815 A | 7/2008 |
| WO | 01-61176 A2 | 8/2001 |

* cited by examiner

1

METHOD FOR ENABLING CALIBRATION DURING START-UP OF A MICRO CONTROLLER UNIT AND INTEGRATED CIRCUIT THEREFOR

FIELD OF THE INVENTION

The field of this invention relates to a method for enabling calibration during start-up of a micro controller unit, and an integrated circuit device therefor.

BACKGROUND OF THE INVENTION

In the field of automotive engine control units (ECUs), it is known for such ECUs to rely on a large amount of data to ensure that the engine operates optimally across a broad range of conditions. Such data is typically stored within on-chip flash memory, and the data is required to be updated or modified, sometimes referred to as 'tuned', whenever a new ECU is developed, or whenever an existing ECU is required to control a new engine, etc. This 'tuning' process is generally known as calibration, and conventionally comprises the use of hardware components to re-map parts of the on-chip flash memory to overlay memories that are typically implemented as random access memory (RAM) external to the ECU.

"Cold-start calibration" is the process of tuning the calibration data specifically to optimise engine performance when starting from a (usually extremely) cold temperature condition. The vehicle is typically required to be left overnight to reach the very low temperature conditions necessary for cold-start calibration. In addition, it is important that the ECU (or any part thereof) is not powered up in advance to avoid any heating effects that could potentially change the cold state behaviour, and that the operation of the ECU during calibration does not differ significantly from normal operation. Furthermore, any interaction with the ECU prior to, or during, the cold-start calibration procedure that is not part of the normal (i.e. production) start-up procedure (for example by way of an external calibration tool or the like) is undesirable, as this too may affect the validity of any calibration performed.

SUMMARY OF THE INVENTION

The present invention provides a method for enabling calibration during start-up of a micro controller unit and an integrated circuit device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Example embodiments of the present invention will now be described with reference to an example of a micro controller unit (MCU), such as may be used within or coupled to an engine control unit (ECU) for use within the automotive industry, and to which it is contemplated that examples of the present invention are particularly applicable. However, it will be understood that examples of the present invention are not limited to such applications, and may equally be applied to the calibration during start-up of any alternative application of a micro controller unit (MCU) device.

Figure 1:
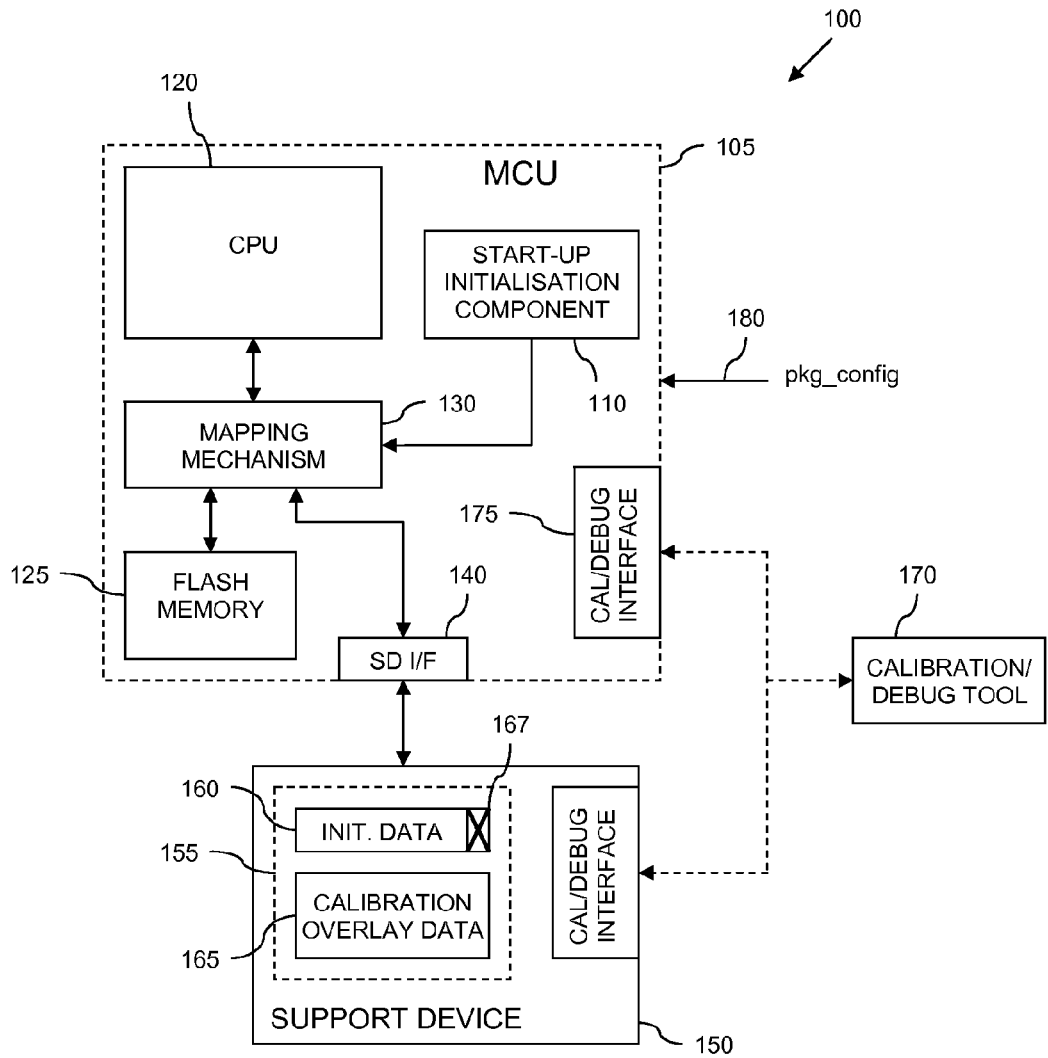
FIG. 1 illustrates an example of a micro controller unit device.

Referring first to FIG. 1, there is illustrated an example of a micro controller unit (MCU) device 100 adapted in accordance with some example embodiments of the present invention. For the illustrated example, the MCU device 100 is provided on an integrated circuit device 105 and comprises signal processing logic in a form of a central processing unit (CPU) 120. The CPU 120 is arranged to execute application program code, and as such is operably coupled to device memory 125 for storing instruction code, data, etc. For the illustrated example, the device memory 125 comprises non-volatile, solid state storage in a form of on-chip flash memory.

In the field of MCU devices, and in particular in the field of automotive ECUs, it is known for such MCUs to rely on a large amount of data, for example in the case of an automotive ECU to ensure that the engine operates optimally across a broad range of conditions. Accordingly, for the illustrated example such data may be stored within on-chip flash memory 125. Such data may be required to be 'tuned', for example in the case of automotive ECUs whenever a new ECU is developed, or whenever an existing ECU is required to control a new engine etc. This tuning process is generally known as calibration. To facilitate such calibration, the MCU device 100 comprises memory mapping functionality, which for the illustrated example is implemented by way of mapping mechanism 130 operably coupled between the CPU 120 and device memory 125. The mapping mechanism may be implemented within hardware, for example by way of address translation logic. A software implementation is also possible, although such an implementation adds computational overhead. The mapping mechanism 130 is configurable to overlay data stored within at least a part of device memory 125 with calibration data stored within, say, an external support device 150, as described in greater detail below.

For applications such as automotive ECUs, it can be necessary to perform such calibration during start-up of the MCU device 100. Furthermore, it may be important for such start-up calibration that the MCU device 100 (or any part thereof) is not powered up in advance of performing the start-up calibration, for example during a 'cold-start calibration' for an ECU, to avoid any heating effects that could potentially change cold-start behaviour.

Additionally and/or alternatively, it may be necessary that the operation of the MCU device 100 during such start-up calibration does not differ significantly from normal operation. Accordingly, for the illustrated example, the MCU device 100 comprises a start-up initialisation component 110 arranged to initialise on start-up at least a part of the MCU device 100. In particular, the initialisation component 110 is arranged, upon start-up of the MCU device 100, to read overlay initialisation data 160 from one or more memory elements 155 within the external support device 150 that is operably coupled to the MCU device 100, and initialise the mapping mechanism 130 of the MCU device 100 to map calibration data 165 stored within the one or more memory element(s) 155 of the external support device 150 onto run-time data stored within the device memory 125 of the MCU device 100, in accordance with the overlay initialisation data 160.

For the illustrated example, the MCU device 100, and in particular the mapping mechanism 130, is operably coupled to the external support device via a support device interface 140. Such an interface may comprise, by way of example, a conventional parallel address and data interface bus comprising address bits sufficient to address the full range of memory 155 on the external support device 150. The data width of such an interface bus may be chosen so that CPU accesses to the memory elements 155 within the external support device 150 comprise a timing similar to that for CPU access to the device memory 125.

In this manner, upon start-up of the MCU device 100, the mapping mechanism 130 may be able to be automatically configured to map calibration data 165 within the support device 150 on to data within the flash device memory 125. Significantly, by providing the initialisation data 160 and the calibration data 165 within the external support device 150, such data may be loaded into the one or more respective memory element(s) 155 without the need for powering-up any part of the MCU device 100. For example, such data 160, 165 may be loaded into the one or more memory element(s) 155 of the external support device 150 when the external support device 150 is disconnected from the MCU device 100, or simply when the MCU device 100 is powered down. The external support device 150 may subsequently be coupled to the MCU device 100, prior to start-up of the MCU device 100, in order to enable the calibration procedure to be performed. Alternatively, the external support device 150 may be 'permanently' connected to the MCU device 100, for example when forming part of a specialised calibration system or the like, but capable of being powered independently from the MCU device 100, allowing data 160, 165 to be loaded before the MCU device is powered up. In this manner, any heating effects resulting from powering-up of any part of the MCU device 100 outside of its normal start-up routine (for example to load calibration data into memory) that could potentially change a cold-start behaviour of the MCU device 100 may be avoided. Such avoidance may be achieved without having to load calibration data, such as the calibration overlay data 165, into memory well in advance, for example the previous day, to allow the MCU device 100 to reach the very low temperature conditions necessary for cold-start calibration.

For clarity, the start-up initialisation component 110 illustrated in FIG. 1 has been depicted as a generally discrete component within the MCU device 100, for example comprising dedicated hardware such as, say, a hardware state machine, an application specific integrated circuit (ASIC) or a programmable microcontroller. However, examples of the present invention are not limited to being implemented within such a discrete/dedicated hardware component, but may equally be implemented (either wholly or in part) by way of software executed on, say, the CPU 120. For example, the start-up initialisation component 110 may form a part of a boot assist module (BAM) that the CPU 120 is arranged to load and run on start-up. In this manner, the start-up initialisation component 110 may be 'activated', for example by way of a function call within a BAM (not shown) executing on the CPU 120 in a case of a software implementation of the start-up initialisation component 110, or as part of the hardware initialisation procedure of the MCU device 100 in a case of a hardware implementation.

For the illustrated example, the mapping mechanism 130 may be arranged to map, or overlay, one or more areas of 'overlay memory' onto one or more areas of memory within the device memory 125. In this manner, when the CPU 120 sends an access request (e.g. a read request) to the device memory 125 directed to an area of memory onto which an area of overlay memory has been mapped, or overlaid, the mapping mechanism 130 re-directs the access request to the corresponding area of overlay memory. The start-up initialisation component 110 may accordingly be arranged, on start-up of the MCU device 100, to configure and/or initialise the mapping mechanism to implement desired/required memory mapping. For example, the start-up initialisation component 110 may be arranged to read overlay initialisation data 160 from the one or more memory elements 155 within an external support device 150 that is operably coupled to the MCU device 100, and to initialise the mapping mechanism 130 of the MCU device 100 to map, or overlay, one or more areas of the memory element(s) 155 (hereinafter referred to simply as 'overlay memory') within the external support device 150 onto one or more areas of memory within the MCU device memory 125 in accordance with the overlay initialisation data 160. The overlay initialisation data 160 may be stored within a predetermined (e.g. fixed) location within the overlay memory 155 of the external support device 150. In this manner, the start-up initialisation component 110 may be arranged to always read the overlay initialisation data 160 from the same location within the overlay memory 155.

In accordance with some examples of the present invention, the start-up initialisation component 110 may be arranged to perform one or more check(s) to ensure that data stored within the overlay memory 155 comprises valid initialisation data 160 and/or calibration data 165. For example, the overlay memory 155 provided by the external support device 150 may comprise any suitable form of data storage technology. However, for some examples of the present invention, overlay memory 155 of the external support device 150 may comprise RAM (random access memory), or some other form of volatile memory. Such volatile memory may require a continuous supply of power in order for stored data to be constantly refreshed, or otherwise actively preserved, in order to maintain the integrity of the data. Accordingly, where the overlay memory 155 comprises, say, RAM, each time power is removed from the overlay memory 155 (e.g. when the support device 150 is powered down), it is necessary for valid data to be re-loaded into the overlay memory 155, or for the overlay memory 155 to be otherwise initialised, upon power being restored thereto (e.g. upon the support device 150 being powered back up).

Thus, in some examples, the start-up initialisation component 110 may be arranged to determine whether the overlay memory 155 of the external support device 150 has been initialised (e.g. valid data has been (re-)loaded since powering up), and to only read data from the overlay memory 155 of the external support device 150 if the overlay memory 155 of the external support device 150 has been initialised. For example, the external support device 150 may be arranged, upon being powered up for example, to set a memory initialisation flag 167, for example within the overlay memory 155 as illustrated in FIG. 1, or other indication to indicate that the overlay memory 155 has not been initialised. A calibration tool (for example illustrated generally at 170) may subsequently load initialisation data 160 and calibration data 165 (e.g. calibration data) into the overlay memory 155, and set the memory initialisation flag 167 to indicate that the overlay memory 155 has been initialised, and contains valid data.

In this manner, if the support device 150 is powered down (and thereby the integrity of any data within the overlay memory 155 is lost), upon the support device 150 being powered up again, the memory initialisation flag 167 is automatically set to indicate that the overlay memory 155 requires initialisation. The start-up initialisation component 110 is thus able to determine the state of the overlay memory 155 by reading the memory initialisation flag 167. If the overlay memory 155 has not been initialised, and as such any data that may have been stored therein prior to the support device 150 being powered down will have been lost, the start-up initialisation component 110 will not blindly use the corrupt/random data within the overlay memory 155 to incorrectly (and potentially harmfully) configure the mapping mechanism to overlay areas of the device memory 125 with random/corrupt data located within the overlay memory 155. Instead, in one example, upon determining that the overlay memory 155 has not been initialised, the start-up initialisation component 110 may be arranged to configure the mapping mechanism 130 to perform no memory mapping of the device memory 125, or at least not to overlay any areas of memory within the overlay memory 155 of the external support device 150. In this manner, the MCU device 100 will be able to start-up and execute under normal conditions (e.g. by way of the CPU 120 executing instruction code and accessing data stored within the device memory 125 in a normal manner).

Thus, the MCU device 100 may start up without corrupt/random data within the overlay memory 155 detrimentally corrupting the operation of the MCU device 100, which in the case of an ECU could result in damage being caused to an engine, etc. Conversely, if the overlay memory 155 has been initialised, such that valid data has been loaded into the overlay memory 155, the start-up initialisation component 110 may continue with reading overlay initialisation data 160 from the overlay memory 155 within the external support device 150. The start up initialisation component 110 may also initialise the mapping mechanism 130 to map calibration data 165 stored within the overlay memory 155 of the external support device 150 on to run-time data within the device memory 125 of the MCU device 100 in accordance with the overlay initialisation data 160.

In some examples, in addition to determining whether the overlay memory 155 of the external support device 150 has been initialised, the start-up initialisation component 110 may further be arranged, upon reading the overlay initialisation data 160 from the overlay memory 155 of the external support device 150, to determine whether the overlay initialisation data 160 is valid. Thereafter, only if it is determined that the overlay initialisation data 160 is valid, the start-up initialisation component 110 may initialise the mapping mechanism 130 to map calibration data 165 stored within the overlay memory 155 of the external support device 150 on to run-time data within the device memory 125 of the MCU device 100 in accordance with the overlay initialisation data 160. For example, upon reading the overlay initialisation data 160 from the overlay memory 155, the start-up initialisation component 110 may be arranged to perform a checksum calculation for the overlay initialisation data 160 to check the validity thereof.

Additionally and/or alternatively, the start-up initialisation component 110 may be arranged to check the formatting of the overlay initialisation data 160 to determine whether the overlay initialisation data 160 comprises the expected format.

One example of how the formatting of the initialisation data might be checked is where there may be a valid header/footer within the structure of the data at predefined locations to indicate valid start and end locations of the initialisation data array. Further, in one example, individual data components may be prefixed or appended with header or footer data to indicate their validity.

It is anticipated that such overly initialisation data 160 may typically comprise only a small amount of data (say less than 200 bytes). Accordingly, performing such checks should not be overly time consuming or resource intensive. In any event, such checks may only be deemed necessary if corruption of the overlay memory 155 within the external support device 150 is viewed as a likely possibility.

Once such a check of the overlay initialisation data 160 has been performed, and following it being determined that the overlay initialisation data 160 read from the overlay memory 155 is valid, the start-up initialisation component 110 may then proceed with initialising/configuring the memory mapping mechanism 130 of the MCU device 100 to overlay data stored within at least a part of device memory 125 for the MCU device 100 with calibration data 165 stored within the overlay memory 155 of the external support device 150 and in accordance with the overlay initialisation data 160.

It is often important that during a start-up calibration procedure, the operation of the MCU device 100 during calibration is as close to normal operation as possible. In order to achieve this, the MCU device 100 should resemble as closely as possible a production MCU device (in terms of both hardware and software). The start-up initialisation component 110 may form a part of a boot assist module (BAM) that the CPU 130 is arranged to load and run on start-up. In this manner, the start-up initialisation component 110 may be 'activated', for example by way of a function call within a BAM (not shown) executing on the CPU 130 in a case of a software implementation of the start-up initialisation component 110. Alternatively, the start-up initialisation component 110 may form a part of the hardware initialisation procedure of the MCU device 100 in a case of a hardware implementation. In either case, it is contemplated that the start-up initialisation component 110 may be present within production versions of the MCU device 100, and that the 'activation' of the start-up initialisation component 110 may form a part of the normal start-up procedure for the MCU device 100, in order that the calibration start-up procedure is as close to the normal (production) start-up procedure for the MCU device 100. However, in some examples, during normal (production) operation of the MCU device 100, the overlaying of calibration data onto data stored within the device memory 125 of the MCU device will neither be required, and nor will there (typically) be an external support device 150 operably coupled to the MCU device 100 comprising overlay initialisation data 160 or calibration data 165.

Thus, it is contemplated that the start-up initialisation component 100 may further be arranged to determine whether device calibration is enabled for the MCU device 100, and only if it is determined that device calibration is enabled for the MCU device 100, proceed with reading overlay initialisation data 160 from overlay memory 155 within an external support device 150 operably coupled to the MCU device 100. For example, it is contemplated that one or more signals may be available to the MCU device 100 indicating whether it is packaged in a production or calibration package, such as a "pkg_config" signal illustrated generally at 180. If it is determined that device calibration is not enabled for the MCU device 100, then the start-up initialisation component 110 may be arranged to not perform the various steps described above for initialising/configuring the mapping functionality 130 of the MCU device 100 to overlay data stored within device memory 125 for the MCU device 100 with calibration data 165 stored within the overlay memory 155 of the external support device 150.

It is also often important that, during a start-up calibration procedure, the operation of the MCU device 100 during calibration is as close to normal operation as possible. In order to achieve this, during calibration, the MCU device 100 should resemble as closely as possible a production MCU device during normal operation (in terms of both hardware and software). Accordingly, in some examples, if it is determined that device calibration is not enabled (as described in the previous paragraph), the start-up initialisation component 110 may be arranged to execute null routines in place of, and comprising timings substantially equivalent to, performing the various steps described above for initialising/configuring the mapping functionality 130 of the MCU device 100 to overlay data stored within device memory 125 for the MCU device 100 with calibration data 165 stored within the overlay memory 155 of the external support device 150. In this manner, the timing of the path flow of the start-up initialisation component 110 when calibration is enabled substantially matches the timing of the path flow of the start-up initialisation component 110 when calibration is not enabled. As such, the overall start-up procedure for the MCU device 100 during calibration differs as little as possible (in terms of at least timing) from the normal overall start-up procedure for the MCU device 100 (i.e. when calibration is not enabled).

In some examples, the start-up initialisation component 110 may also be arranged to execute such null routines in place of performing the various steps described above for initialising/configuring the mapping functionality 130 of the MCU device 100 if device calibration is enabled, but it is determined that data within the external support device 150 is not valid (e.g. the overlay memory 155 has not be initialised, or the initiation data 160 does not pass a checksum of format check). In this manner, the timing of all path flows of the start-up initialisation component 110 may be substantially matched.

As also illustrated in FIG. 1, the MCU device 100 may comprise a calibration/debug interface 175 for enabling a calibration/debug tool 170 or the like to be operably coupled thereto, for example to enable settings and/or data to be manipulated and/or for debug log files or other settings and/or data to be uploaded. For conventional techniques for performing start-up calibration of an MCU device, such a calibration/debug tool has typically been used to configure calibration data in an area of memory of the MCU device for use during start-up. The problem with such conventional techniques is that, in order for such data to be configured, either at least part of the MCU device is required to be powered up in order to enable the calibration/debug tool to access the device memory to configure the data in advance of the start-up procedure being initiated, or the calibration/debug tool is required to interrupt the start-up procedure to configure the data in the device memory, such an interruption being required to be performed sufficiently early on in the start-up procedure to ensure that the data is configured before it is required.

A problem with the first of these two conventional techniques for configuring calibration data within an MCU device is that the need to power up part of the MCU device is likely to cause heating effects that could potentially change cold state behaviour of the MCU device. Accordingly, for cold-start calibration, such configuration is required to be performed well in advance of the actual calibration in order to allow the MCU device to subsequently reach the very low temperature conditions necessary for cold-start calibration. Such a delay in being able to perform the calibration is clearly undesirable.

A problem with the second of the two conventional techniques mentioned above for configuring calibration data within an MCU device is that interruption to the start-up procedure may affect the validity of any calibration performed. Accordingly, such a technique is clearly not acceptable for start-up calibration.

For the example of the present invention illustrated in FIG. 1, by providing calibration data with overlay memory 155 provided within an external support device 150, the calibration data may be configured independently of the MCU device 100, thereby substantially avoiding any need to power up the MCU device, and thus avoid or at least reduce any potential heating effects. Furthermore, by arranging the start-up initialisation component 110 to automatically cause the mapping functionality 130 of the MCU device 100 to overlay the calibration data 165 within the external support device 150 on to the MCU device memory 125 in accordance with initialisation data provided within the overlay memory, there is no need for any calibration/debug tool 170 to be connected to the MCU device during start-up. In this manner, any undesirable interaction with the MCU device 100 prior to or during a cold-start calibration procedure that is not part of the normal (production) start-up procedure may be substantially avoided.

Figure 2:
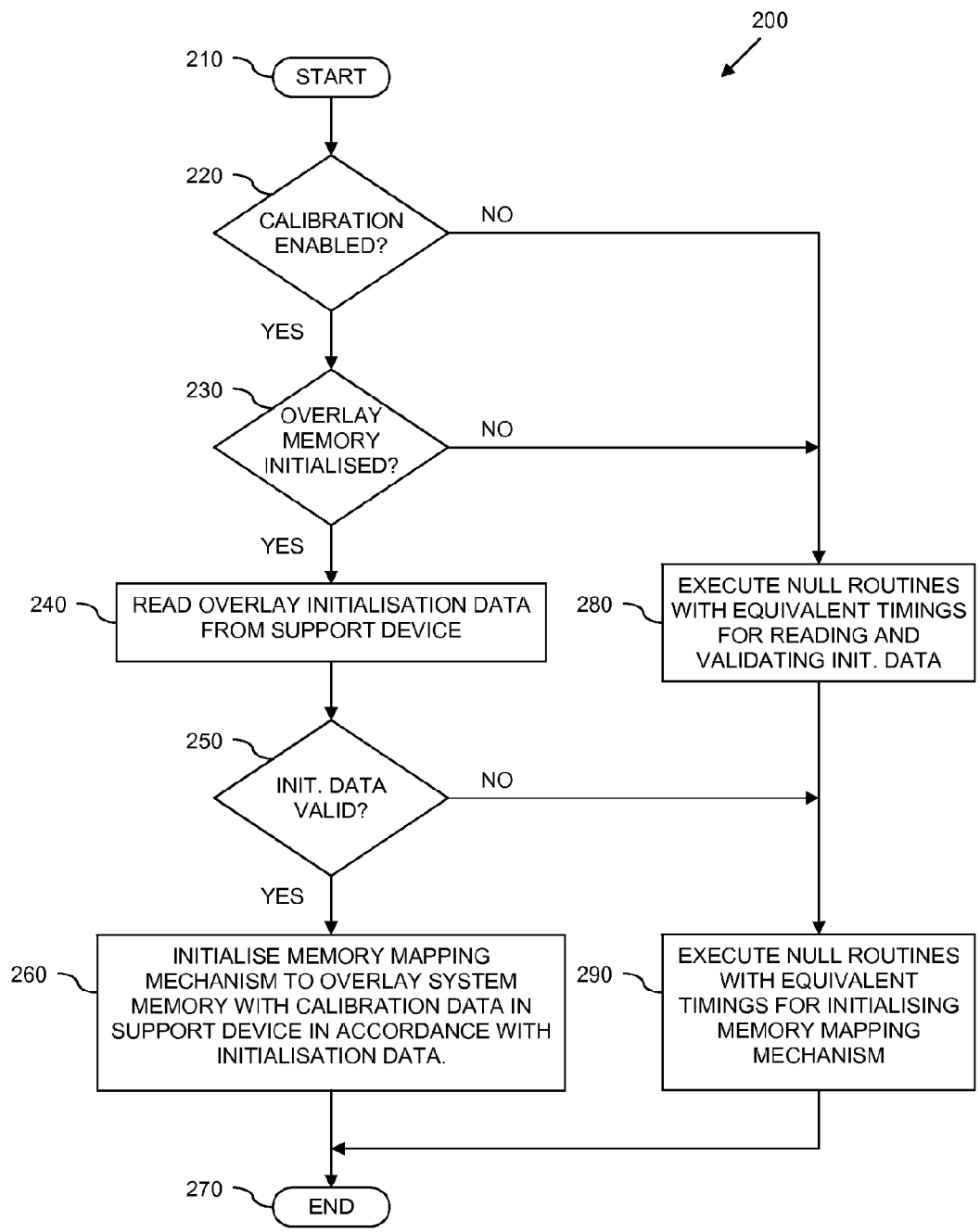
FIGS. 2 and 3 illustrate a method for enabling calibration during start-up of a micro controller unit.

Referring now to FIG. 2, there is illustrated an example of a simplified flowchart 200 of a method for enabling calibration, during start-up, of a micro controller unit (MCU) device, for example as may be implemented by the start-up initialisation component 110 of FIG. 1. The method starts at step 210, and moves on to step 220 where for the illustrated example it is determined whether (or not) device calibration is enabled for the MCU device. For example, step 220 may comprise checking whether a calibration package signal is set, such as pkg_config 180 in FIG. 1. If it is determined that device calibration is enabled in step 220, the method moves on to step 230 where for the illustrated example it is determined whether (or not) an area of memory within an external support device has been initialised, such as the overlay memory 155 illustrated in FIG. 1. For example, the step of determining whether (or not) the area of memory within the external support device has been initialised may comprise checking whether a memory initialisation flag has been set within the external support device, such as the memory initialisation flag 167 of FIG. 1. If it is determined that the area of memory within the external support device has been initialised in step 230, the method moves on to step 240, where overlay initialisation data is read from the area of memory within the external support device. Having read the overlay initialisation data, the method illustrated in FIG. 1 then moves on to step 250 where it is determined whether (or not) the overlay initialisation data is valid, for example by way of performing a checksum calculation and/or checking a format of the data read. If it is determined that the overlay initialisation data is valid in step 250, the method moves on to step 260 where memory mapping functionality, such as the memory mapping mechanism 130 illustrated in FIG. 1, is then initialised/configured to map calibration data stored within the memory of the external support device on to run-time data within device memory of the MCU device in accordance with the previously read overlay initialisation data. The method then ends at step 270.

Referring back to step 220 and step 230, if it is determined that calibration is not enabled (step 220), or it is determined that the area of memory within the external device has not been initialised (step 230), the method moves on to step 280 and step 290, where null routines are executed in place of, and comprising timings substantially equivalent to, the steps 240 and 250 of reading and validating overlay initialisation date (step 280) and step 260 of initialising/configuring the mapping functionality (step 290). Additionally for the illustrated example, if at step 250 it is determined that the overlay initialisation data is not valid, the method moves to step 290 where null routines are executed in place of, and comprising timings substantially equivalent to, step 260 of initialising/configuring the mapping functionality. The method then ends at step 270.

Figure 3:
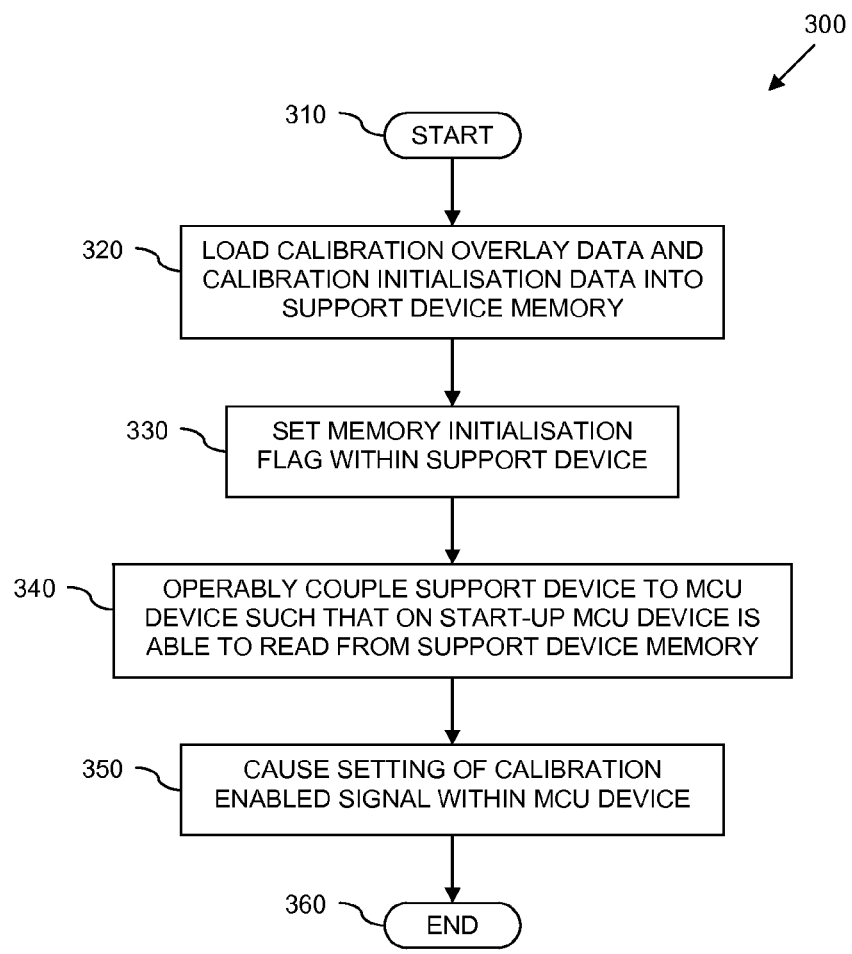

Referring to FIG. 3, there is illustrated an example of a simplified flowchart 300 of a method for enabling calibration during start-up of a micro-controller unit (MCU) device according to some embodiments of a further aspect of the present invention. The method of FIG. 3 starts at step 310 and moves on to step 320 where calibration data and overlay initialisation data are loaded into at least one memory element of an external support device, such as external support device 150 of FIG. 1. A memory initialisation flag is then set within the external support device at step 330. The method further comprises operably coupling the external support device to the MCU device such that, on start-up of the MCU device, the MCU device is able to read from the at least one memory element of the external support device, at step 340. The method then moves on to step 350, where a calibration enabled signal is caused to be set within the MCU device, and the method ends at step 360.

Although, for the illustrated example, the steps 320, 330 of loading data into memory of the external support device and the setting of the memory initialisation flag have been illustrated and described as being performed before operably coupling the external support device to the MCU device, it will be appreciated that the external support device may equally be operably coupled (at least physically or mechanically) to the MCU device prior to the steps 320, 330 of loading data into memory of the external support device and the setting of the memory initialisation flag. Similarly, it will be appreciated that the step of causing the setting of a calibration enabled signal within the MCU device may not be limited to being performed last with respect to the other steps 320 to 340 of the illustrated example of the method of FIG. 3.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The invention may also be implemented, as a whole or in part, in a computer program for running on a computer system, at least including code portions for performing steps of a method according to the invention when run on a programmable apparatus, such as a computer processing unit (CPU), or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

For example, the integrated circuit device 105 described herein may comprise a semiconductor substrate of any semiconductor material or combinations of materials, such as gallium arsenide, silicon germanium, silicon-on-insulator (SOI), silicon, monocrystalline silicon, the like, and combinations of the above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented that achieve the same functionality. For the example illustrated in FIG. 1, the start-up initialisation component 110 has been illustrated as a discrete logical entity, which may equally be implemented by way of computer executable code intended for execution by, for the illustrated example, the CPU 120. Alternatively, the start-up initialisation component 110 may be implemented by way of hardware integrated within one or more other components within the MCU device 100. For example, the start-up initialisation component may be implemented, at least partly, by way of hardware integrated within, say, mapping mechanism 130.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit 105 or within a same device 100, as illustrated in FIG. 1. However, it is contemplated that one or more components of the MCU device 100 may be implemented as any number of separate integrated circuits or separate devices interconnected with each other in a suitable manner. For example, the device memory element 125, which for the illustrated example comprises on-chip Flash memory may equally be implemented by way of off-chip memory or the like.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, mini- computers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for calibration during start-up of a micro controller unit (MCU) device, the method comprising:
   reading, by the MCU device, overlay initialisation data from at least one memory element within an external support device operably coupled to the MCU device; and
   configuring memory mapping functionality of the MCU device to map an area of a device memory of the MCU device to an area of the at least one memory element of the external support device in accordance with the overlay initialisation data, wherein an access request for the area of the device memory is re-directed to the area of the at least one memory element of the external support device in response to the area of the device memory being mapped to the area of the at least one memory element of the external support device.

2. The method of claim 1 wherein the method further comprises:
   determining whether the at least one memory element of the external support device has been initialized; and
   if it is determined that the at least one memory element of the external support device has been initialised, reading the overlay initialisation data from the at least one memory element within the external support device.

3. The method of claim 2 wherein said determining whether the at least one memory element of the external support device has been initialised comprises checking whether a memory initialisation flag has been set within the external support device.

4. The method of claim 1 further comprising:
   determining whether the overlay initialisation data is valid upon reading the overlay initialisation data.

5. The method of claim 4 further comprising:
   if it is determined that the overlay initialisation data is valid, initialising the memory mapping functionality of the MCU device to overlay data stored within at least a part of device memory for the MCU device with data stored within the at least one memory element of the external support device in accordance with the overlay initialisation data.

6. The method of claim 4 wherein said determining whether the overlay initialisation data is valid comprises at least one of:
performing a checksum calculation for the overlay initialisation data; and
checking a formatting of the overlay initialisation data.

7. The method of claim 1 wherein the method further comprises:
determining that device calibration is enabled for the MCU device prior to reading the overlay initialisation data from at least one memory element.

8. The method of claim 7 wherein said determining whether device calibration is enabled for the MCU device comprises checking whether a calibration package signal is set.

9. The method of claim 7 further comprising:
executing null routines in place of, and comprising timings equivalent to, initialising the memory mapping functionality of the MCU, if it is determined that device calibration is not enabled for the MCU device.

10. The method of claim 1 wherein the method forms a part of a MCU boot assist procedure.

11. The method of claim 1 further comprising:
storing calibration data for the MCU device in the area of the at least one memory element of the external support device while the MCU device is powered down.

12. An integrated circuit device comprising:
a micro controller unit (MCU) device; and
a start-up initialisation component associated with the MCU device and arranged to initialise at least a part of the MCU device by being arranged, upon start-up of the MCU device, to:
read overlay initialisation data from at least one memory element within an external support device operably coupled to the MCU device; and
configure memory mapping functionality of the MCU device to an area of a device memory of the MCU device to an area of the at least one memory element of the external support device in accordance with the overlay initialisation data, wherein an access request for the area of the device memory is re-directed to the area of the at least one memory element of the external support device in response to the area of the device memory being mapped to the area of the at least one memory element of the external support device.

13. The integrated circuit device of claim 12 wherein the startup initialisation component is further arranged to:
determine whether the at least one memory element has been initialized; and
read the overlay initialization data from the at least one memory element, if the at least one memory element has been initialized.

14. The integrated circuit device of claim 13 wherein the startup initialisation component is arranged to determine whether the at least one memory element has been initialized by being further arranged to:
check whether a memory initialisation flag has been set within the external support device.

15. The integrated circuit device of claim 12 wherein the startup initialisation component is further arranged to determine whether the overlay initialisation data is valid upon reading the overlay initialisation data.

16. The integrated circuit device of claim 15 wherein the startup initialisation component is arranged to determine whether the overlay initialisation data is valid by being further arranged to:
perform a checksum calculation for the overlay initialisation data; and
check a format of the overlay initialisation data.

17. The integrated circuit device of claim 12, wherein calibration data for the MCU device is stored in the area of the at least one memory element of the external support device while the MCU device is powered down.

18. The integrated circuit device of claim 12 wherein the external support device is permanently connected to the MCU device, and the external support device is powered independently from the MCU device.

19. A micro controller unit (MCU) device comprising:
a memory mapping module;
at least one device memory operably coupled to the memory mapping module; and
a start-up initialisation component operably coupled to the memory mapping module, and configured, upon startup of the MCU device to:
read overlay initialisation data from at least one memory element within an external support device operably coupled to the MCU device; and
configure memory mapping functionality of the MCU device to an area of a device memory of the MCU device to an area of the at least one memory element of the external support device in accordance with the overlay initialisation data, wherein an access request for the area of the device memory is re-directed to the area of the at least one memory element of the external support device in response to the are of the device memory being mapped to the area of the at least one memory element of the external support device.

20. The micro controller unit (MCU) device of claim 19, wherein calibration data for the MCU device is stored in the area of the at least one memory element of the external support device while the MCU device is powered down.

* * * * *